United States Patent [19]

Jaki

[11] Patent Number: 5,142,429
[45] Date of Patent: Aug. 25, 1992

[54] OVERVOLTAGE AND OVERCURRENT PROTECTIVE CIRCUIT WITH HIGH EARTH BALANCE

[75] Inventor: Ivan Jaki, Norsborg, Sweden

[73] Assignee: Telefonaktiebolaget L M Ericsson, Stockholm, Sweden

[21] Appl. No.: 680,510

[22] Filed: Apr. 4, 1991

[30] Foreign Application Priority Data

May 7, 1990 [SE] Sweden .................................. 9001626

[51] Int. Cl.$^5$ .............................................. H02H 9/00
[52] U.S. Cl. ...................................... 361/56; 379/345; 379/412
[58] Field of Search ................ 361/56, 57, 58, 105, 361/126; 379/345, 402, 412; 333/119

[56] References Cited

U.S. PATENT DOCUMENTS

| | | | |
|---|---|---|---|
| 4,032,718 | 6/1977 | O'Neill | 379/402 |
| 4,398,066 | 8/1983 | Sinberg | 361/58 |
| 4,539,443 | 9/1985 | Jaki | 379/345 |
| 4,590,334 | 5/1986 | Jaki | 379/402 |

FOREIGN PATENT DOCUMENTS 839581 6/1960 United Kingdom ................ 333/117

*Primary Examiner*—Steven L. Stephan
*Assistant Examiner*—E. H. To
*Attorney, Agent, or Firm*—Burns, Doane, Swecker & Mathis

[57] ABSTRACT

An overvoltage and overcurrent protection for an exchange terminal circuit which has two input terminals (a, b) and a number of output terminals (T1-T). The input terminals are connected to a two-wire line and the output terminals are connected to equipment for the transmission of analog as well as digital signals over the line via the exchange terminal circuit. The exchange terminal circuit comprises an impedance matching network having a transformer at the primary as well as secondary sides of which there are networks that are symmetric in respect to earth. The network at the primary side comprises two primary winding halves (L1, L2) between which a capacitor (C) is series connected. The novel features of the invention is a varistor (V1) that is connected in parallel with the capacitor (C). When a surge pulse has charged the capacitor to the rated voltage of the varistor the varistor goes conductive thereby increasing the current through the primary winding until the core of the transformer is saturated. At the secondary side of the transformer there is a varistor (V2) and Zener diodes (Z5-Z8) which act to stepwise reduce the surge pulse as transformed to the secondary to a voltage which is safe for the connected equipment.

4 Claims, 2 Drawing Sheets

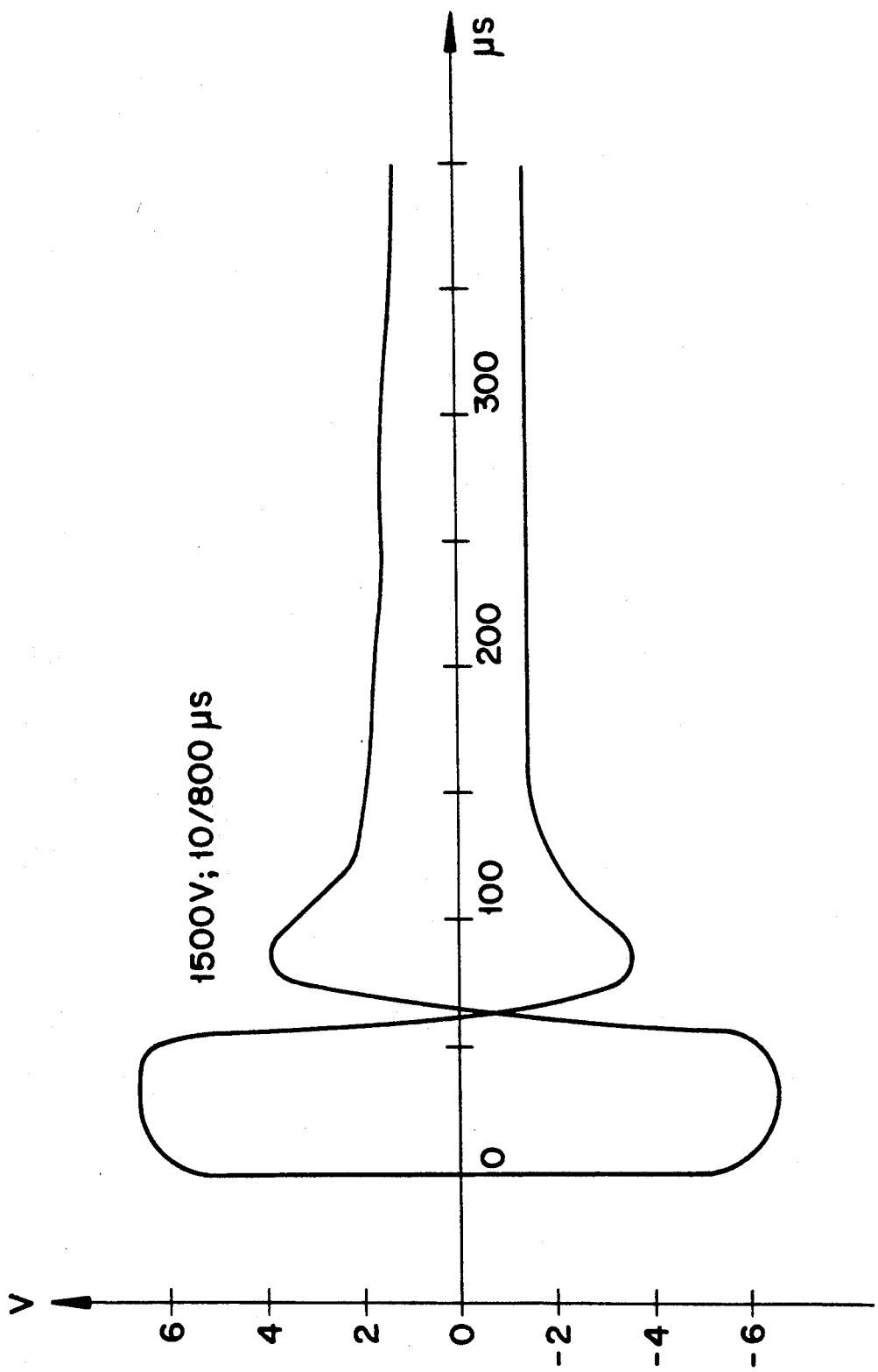

OVERVOLTAGE AND OVERCURRENT PROTECTIVE CIRCUIT WITH HIGH EARTH BALANCE

TECHNICAL FIELD

The present invention relates to an overvoltage and overcurrent protective circuit for an exchange terminal circuit intended for connection to a two-wire line over which both analogue and digital signals are transmitted in both directions. The terminal circuit enables a two-wire connection to be converted to a four-wire connection, a five-wire connection or a connection of another high order, and functions primarily as means for matching the impedance of transmitting and receiving equipment with line impedance. The protective circuit may be located in the U-interface of an ISDN-network, in which case it forms a so-called net terminal. The overvoltage and overcurrent protective circuit may also be mounted in exchange terminal circuits located in the R-interface, S-interface or T-interface of an ISDN-network. The inventive protective circuit can also be incorporated in an exchange terminal circuit on the station side or on the subscriber side of a conventional telephone network.

BACKGROUND ART

A net terminal which enables a transition to be made from a two-wire connection to a four-wire connection is known from our specification U.S. Pat. No. 4,539,443.

An exchange terminal circuit is normally located in a line terminal of a telephone exchange and has two input terminals for connection of the two-wire line. The terminal circuit must be capable of fulfilling many requirements. For instance, the circuit input terminals must be balanced against a reference potential, normally earth, since so-called longitudinal currents will otherwise occur over the line. Furthermore, the exchange terminal circuit shall exhibit a high degree of echo attenuation. Effective attenuation distortion and basic attenuation within a prevailing frequency band, i.e. with either the speech frequency band or the bit frequency band of the digital signals, shall be small. Another requirement is that so-called loop attenuation shall be low between transmitting and receiving equipment on the subscriber side or the telephone exchange side or the like.

In the case of a net terminal, the terminal shall enable connection of a supply voltage source which delivers current to the subscriber equipment located at the other end of the line, through the circuit input terminals. This current is normally used for line signalling purposes, in conjunction with telephony.

The known subscriber net terminal is intended for the transmission of speech signals within the frequency range of about 300 Hz to about 3.5 kHz, and for the transmission of line signalling signals, which, as is known, are of the direct current type. Problems occur, however, when the subscriber line is used for the transmission of digital signals, which signals are transmitted at much higher frequencies than the speech frequencies. The digital signals are attenuated much more strongly than the speech signals, and consequently it is necessary to transmit the digital signals at a higher power level. This in turn places a greater demand on good earth balance.

The purpose of the overvoltage and overcurrent protective circuit is to protect expensive equipment connected to the output side of the terminal circuit or net terminal against overcurrents and overvoltages caused, for instance, by lightning voltages on the subscriber line, interfering electromagnetic fields, unintentional connection of the line to the electrical power network, e.g. 220 V a.c. current, as a result of fire for instance, or as a result of clumsiness, or as a result of unsuitable positioning of the line in the close proximity of a power cable, such that the line and cable are brought into electrical contact with one another through the influence of stormy weather, animals or in some other fashion.

The overcurrent and overvoltage protective circuit shall not influence the aforesaid electrical properties of the terminal circuit.

Thus, when the line is earthed or short-circuited, it is necessary to limit the current delivered to equipment in order to ensure that the equipment will not be damaged. Digital exchange equipment connected to the line will normally have an operating voltage of 5 V and is dimensioned to withstand a maximum voltage of about 5 volts without being destroyed. The overvoltage generated on the line by lightning may, for instance, be in the order of 1500 volts.

In present day systems, large glow valves, or cold cathode tubes, are connected between each wire of the subscriber line and earth on the input side of a telephone exchange as a primary means of protection. These glow valves are sluggish and have a reaction time of about 1 ms. The maximum voltage of a lightning pulse is manifest after about 10 microseconds. Furthermore, the flow valve is triggered at different moments in time, resulting in the occurrence of a transversal residual voltage over the two wires of the line.

Fire must never occur in an overvoltage and overcurrent protective circuit. In the case of a known overvoltage and overcurrent protector of the kind illustrated in the accompanying FIG. 1, the overvoltage is restricted with the aid of two wire-wound resistors. If the overvoltage is of long duration and high, there is a danger that these wire resistors may begin to glow and therewith present a fire risk. These wire-wound resistors must be matched or paired with one another in order to prevent the overvoltage protector from influencing the earth balance of the terminal circuit. The so-called component nominal voltage of the resistors, i.e. their durability to voltage, must be high in order to be able to resist high overvoltages. Furthermore, the resistors must be physically large, in order to withstand high powers.

The known protective circuit also includes a line transformer. When the current passing through the transformer is high, there is a danger that the foil on the circuit cord or board on which the overcurrent and overvoltage protector is mounted will begin to burn.

It is known to use temperature responsive resistors, so-called PTC-resistors, as current limiting protectors. The drawback with these resistors, however, is that their component nominal voltage is limited, and consequently electric sparking is likely to occur in a component should the component be subjected to a high voltage. The positioning of these PTC-resistors is also critical. If the current passing through a PTC-resistor is high, the resistor will begin to melt and the molten material is liable to ignite the underlying foil board or card. When PTC-resistors are subjected to high currents and voltages, they also tend to crack as a result of temperature gradients occurring in the resistor mass, whereupon the protective facility no longer exists.

The use of zener-diodes as a means for protecting against overvoltages is known to the art. Such zener-diodes shall have the steepest possible characteristic curve. This creates dynamic problems, however, since many harmonics (overtones), harmonic distortions and intermodulation products occur, which have a negative influence on the quality of signal transmission.

The earth balance requirement implies, among other things, that the voltage imbalance in the protective circuit may reach at maximum 60 decibels. When seen against a line impedance of about 600 ohms, this means that the resistance in the earth symmetrical circuits of the line voltage protector may mutually differ by about 0.1 ohm at most. Line-running is therefore critical.

SUMMARY OF THE INVENTION

One object of the present invention is to provide an overvoltage and overcurrent protective circuit which has a high earth balance, which can be constructed from small and inexpensive components and which can be used effectively in an exchange terminal circuit or net terminal.

Another object of the invention is to provide a protective circuit of the kind described in the introduction which comprises a transformer whose primary winding is connected directly to the input terminals of the subscriber line without intermediate series connection of wire-wound current limiting resistors.

More specifically, this transformer shall form a part of the terminal circuit, namely the terminal-circuit line transformer.

The protective circuit shall actively use the terminal-circuit line transformer to reduce the time period over which an overvoltage pulse occurring on the line is transmitted from the line to the protected equipment, through transformer effect. The pulse energy transmitted to the secondary side of the transformer through transformer effect is reduced in this way, thereby enabling small components to be used on the secondary side of the overcurrent and overvoltage protective circuit.

Echo attenuation, effective attenuation distortion, basic attenuation and loop attenuation shall be greatly reduced within both the speech frequency band and those frequency bands used for data bit transmission. The fashion in which the components are mounted in relation to one another is not critical. Neither need the zener-diodes included in the protective device exhibit steep characteristics.

Overvoltages and overcurrents shall be reduced stepwise in the different components of in the protective circuit, which therewith reduces the nominal component voltages and enables inexpensive standard components to be used.

The characteristic feature of the invention resides in a varistor and two PTC-resistors, which together with the primary winding of the line transformer are included in an earth-balanced circuit.

BRIEF DESCRIPTION OF THE DRAWINGS

The invention will now be described in more detail with reference to the accompanying drawings, in which

FIG. 3 is a diagram which illustrates the voltage over the output of the overvoltage and overcurrent protective circuit illustrated in FIG. 2 for a lightning pulse.

BEST MODES OF CARRYING OUT THE INVENTION

Figure 1:
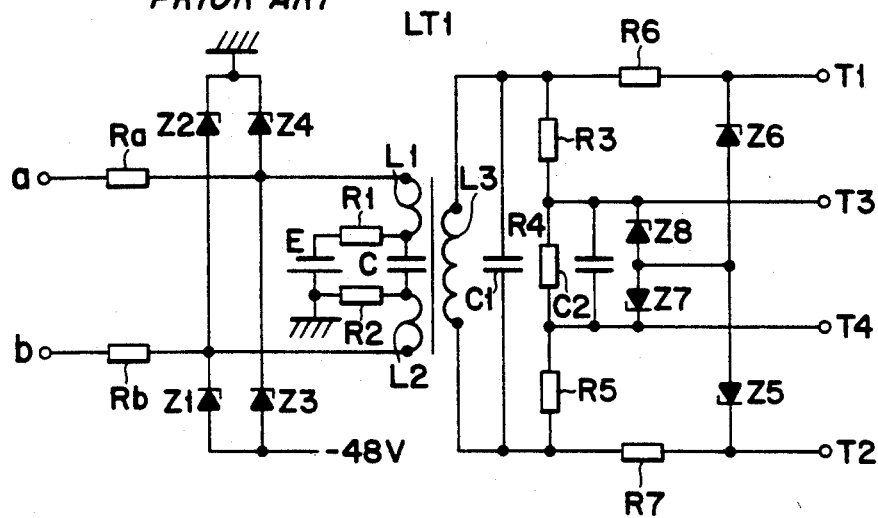
FIG. 1 illustrates a known overvoltage and overcurrent protective circuit.
Figure 2:
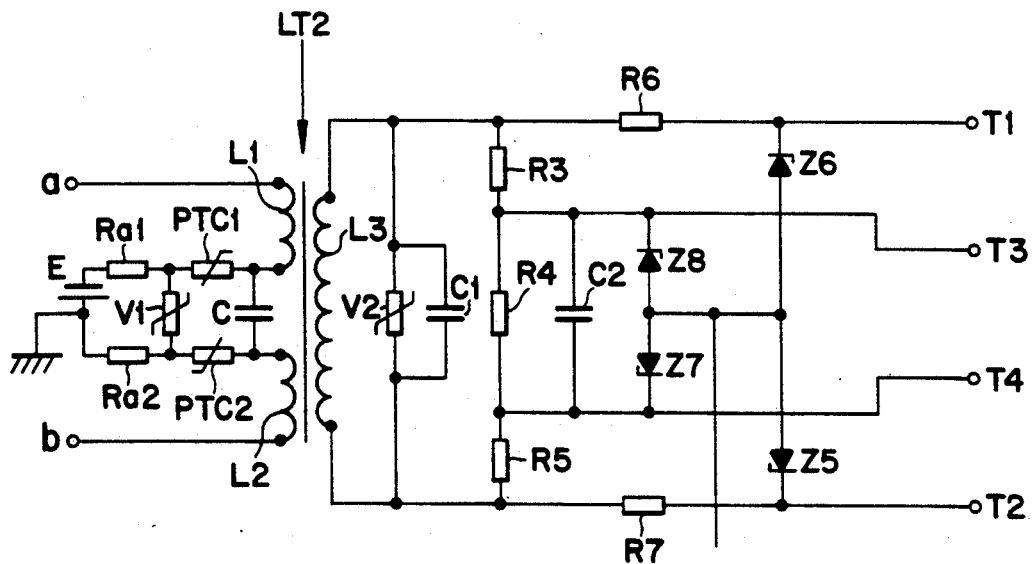
FIG. 2 is a diagram illustrating an overvoltage and overcurrent protective circuit according to the invention.

FIG. 1 illustrates an overvoltage and overcurrent protective circuit of a known kind. The circuit is mounted in a terminal circuit or net terminal of known kind and connected to the two wires of a subscriber line at the input terminals a, b of the terminal circuit. In this case, the line terminal circuit has four output terminals T1, T2, T3 and T4. Transmitter equipment (not shown) is connected between T1 and T2 and receiver equipment (not shown) is connected between the terminals T3 and T4. Only those terminal circuit components which are significant to the invention are shown in FIG. 2. Remaining components significant to the function of the terminal circuit as a terminal circuit are not shown.

A line transformer LT1 has a primary winding consisting of two winding halves L1, L2, between which a centre-point capacitor C is connected in series, therewith to form a series combination whose one end is connected to the input terminal a through a series-connected current limiting resistor Ra, and whose other end is connected to the input terminal b through a second current limiting resistor Rb. A voltage source E is connected across the centre-point capacitor C, through resistors R1 and R2. The negative pole of the voltage source is earthed. Zener-diodes Z1, Z2, Z3 and Z4 are connected in the manner shown between a reference voltage, designated −48 V, and earth and said two ends of the series combination L1-C-L2, in the manner illustrated. The current source E is used to supply direct current to the subscriber equipment. The circuit on the primary side is symmetrical with respect to the earth. The current limiting resistors Ra, Rb comprise large wire-wound resistors. The zener-diodes Z1–Z4 function as overvoltage protectors which short-circuit overvoltages to earth. The transformer LT1 has a secondary winding L3, across which a capacitor C1 is connected in parallel. Zener-diodes Z5–Z8 function as overvoltage protectors for the transmitting and receiving equipment.

The circuit illustrated in FIG. 1 has the drawbacks described in the introduction, these drawbacks being due essentially to the presence of the resistors Ra and Rb.

FIG. 2 illustrates an inventive overvoltage and overcurrent protective circuit. Those components in the circuit shown in FIG. 2 which have correspondence in the circuit shown in FIG. 1 have been identified with the same reference signs. The circuit includes a line transformer LT2 having a primary winding which consists of two winding halves L1 and L2, and a secondary winding which consists of two winding halves L3 and L4.

The circuit on the primary side includes the aforesaid series combination L1-C-L2, which is similar to the combination shown in FIG. 1. The significant difference, however, lies in the fact that the end points of this series combination are connected directly to the input terminals a, b in the absence of intermediate series-connected current-limiting resistors Ra, Rb. Instead, current is limited by means of a varistor V1 which is connected in parallel to the centre-point capacitor C, through PTC-resistors PTC1, PTC2. One of said PTC-resistors is connected in series between one end of the varistor and one plate of the centre-point capacitor, whereas the other PTC-resistor is connected in series with the other end of the varistor V1 and the other capacitor plate. Resistors Ra1 and Ra2 function as current limiting resistors, although, as will be described in more detail hereinafter, these resistors can be made much smaller, both with respect to their volume and their resistance values, than the current limiting resistors Ra and Rb shown in FIG. 1. The resistor Ra1 is connected in series between one end of the varistor and one pole of the voltage source E, and the resistor Ra2 is connected in series between the other end of the varistor and the other pole of the voltage source E, in this case the negative pole. This negative pole is earthed.

The varistor V1 is of a metal-oxide type and can be described as a voltage-dependent resistor having symmetrical voltage/current properties. The resistance value decreases abruptly when the voltage exceeds a rated or nominal voltage. The response time for a varistor of this kind is less than about 25 ns (nanoseconds).

A PTC-resistor, also called a cold conductor, is a temperature-dependent semiconductor resistor whose resistance value increases with increasing temperature. The resistance value increases abruptly at a given determined temperature, referred to as the reference temperature. Due to its very high positive temperature coefficient, the resistor is called a PTC-resistor (positive temperature coefficient).

The circuit on the primary side operates in the following manner:

In the event of a lightning pulse on the subscriber line, the capacitor C will begin to charge, whereupon the voltage across the capacitor rises. When the capacitor voltage exceeds the nominal voltage of the varistor, the varistor V1 will begin to conduct, wherewith current through the varistor increases radically, causing an accelerated current increase through the primary winding until the transformer core is saturated. From now on practically no further energy is transmitted to the secondary side of the transformer. Since the current through the varistor increases, the extent to which the resistors Ra1 and Ra2 need to absorb current is markedly reduced in relation to the extent to which the resistors Ra and Rb in the circuit shown in FIG. 1 need absorb current. Consequently, the resistors Ra1 and Ra2 can be made much smaller, i.e. smaller with respect to volume and also with respect to resistance value.

When the varistor V1 begins to conduct, current will also pass through the temperature-responsive resistors PTC1 and PTC2, the temperatures of which begin to rise until the reference temperature is reached, whereupon the resistance values of the resistors rise abruptly. This reduces the switching time of the resistors PTC1, PTC2.

As beforementioned, when the varistor opens there is an accelerated increase in current through the primary winding. This increase in current continues until the core of the transformer T2 is saturated. Practically no additional energy is transmitted to the secondary side of the transformer from the time at which the transformer core becomes saturated. The voltage delivered to the secondary side up to the moment of saturation is reduced in two stages, partly by the varistor V2, which is connected in parallel across the secondary winding of the transformer, partly by the zener diodes Z5, Z6, which protect the transmitter equipment connected across the terminals T1, T2, and partly by the zener diodes Z7, Z8, which protect the receiver equipment connected across the terminals T3, T4. The varistor V2 may have a nominal voltage of 60 V for instance, meaning that all voltages above 60 V will be absorbed by the varistor V2. The zener diodes Z5–Z8 need therefore only absorb those voltages that are smaller than 60 V. In the embodiment illustrated in FIG. 1, it is necessary for the zener diodes Z5–Z8 to also absorb all voltages above 60 V, which places high demands on the characteristics of the zener diodes, particularly in the region of low currents, i.e. in the transition region from non-conductive to conductive zener-diode states. In the case of the inventive overvoltage protector, a lower requirement is placed on the high dynamic slope resistance of the zener diode.

FIG. 3 illustrates the voltage across the zener diodes Z5, Z6 for a lightning pulse of 1500 volts and a duration of 800 microseconds, applied to the primary side over the terminals a, b. The voltage of the lightning pulse rises from 0 volt to 1500 volts in 10 $\mu$s. In FIG. 3, the Y-axis designates the voltage in volts and the X-axis the time in microseconds. The lightning pulse begins at time point t=0. The varistor V1 opens and becomes fully conductive when the voltage across its ends reaches 90 volts and, in a corresponding manner, the varistor V2 opens when the voltage across its ends is 17 volts. The capacitor C1 is on 3.9 nF and the capacitor C2 is on 6.8 nF. It will be seen from the diagram that the transformer core is saturated after only 50 microseconds and that the voltage on the secondary side begins to fall from about 6.2 volts down to about 1.8 volts balanced, which is achieved after 150 microseconds. The balance to earth is faultless.

Since the time taken for the overvoltage to be transferred from the primary side to the secondary side of the line transformer, through the transformer effect that takes place, is reduced to about 50 microseconds, the pulse energy $J = A \times V \times t$ (J=the energy expressed in Joules, A=current, V=the voltage on the secondary side and t=time) will be small and the components in the circuit can have small dimensions.

The PTC-resistors PTC1, PTC2 are unable to switch to high resistances in the case of brief transversal pulses occurring on the line, and the dominating part of the pulse energy is again led to the line, through the combination L1-PTC1-V1-PTC2-L2, where said energy is absorbed.

During the first phase of a lightning pulse, more specifically during about the first 50 microseconds up to saturation of the transformer core, energy will be stored in the transformer core and in the capacitor. When the varistor V1 is then opened, i.e. short-circuited, all energy will be passed beyond L1, L2 and out onto the line again.

When PTC1 and PTC2 switch-over and become high-ohmic, the resistors will absorb the overvoltage. The thermal power P which the resistors need to absorb is then very small, since $P = U^2 R$, where R is the now very high resistance of the PTC-resistor.

In the case of an overvoltage of long duration, e.g. 220 V alternating voltage on the line, the centre-point capacitor C will have a very high impedance 1/C and all current will pass through L1-C-L2. Where $\omega = 2 \times \pi \times f$, and f signifies the alternating voltage frequency. A typical total current in this case is about 70 mA. The branch Ra1, V1, Ra2 is short-circuited and the copper resistance of the primary winding will absorb all thermal power, which in a typical case is of the order of about 0.5 watt.

The nominal voltage of the varistor V1 must not be so low that the varistor will begin to conduct at the supply voltage E. In other words, the nominal voltage shall be adapted to the supply voltage E.

Evidence that the inventive overcurrent and overvoltage protector improves the earth balance is found in the fact that the current limiting resistors Ra and Rb of the FIG. 1 embodiment need no longer be included in the protective circuit. The earth balance in the case of low frequency signals is determined by Ra1 and Ra2, and to some extent also by PTC1 and PTC2. In the case of slightly higher signal frequencies, at which the centre-point capacitor C begins to short-circuit PTC1 and PTC2, the earth balance is determined by the copper resistance in the primary winding of the line transformer. V1, Ra1 and Ra2 no longer influence the balance. In the case of high signal frequencies, the earth balance is determined by the switching factor between L1 and L3 and the switching factor between L2 and L3, plus the copper resistance in the primary winding L1, L2. This shall be compared with the known circuit illustrated in FIG. 1, in which the resistors Ra and Rb influence the earth balance at all frequencies.

The inventive overcurrent and overvoltage protective circuit will improve echo attenuation, because the inventive circuit does not include the resistors Ra and Rb of the FIG. 1 embodiment. Impedance matching of the line circuit is also improved, since no power is consumed in Ra and Rb. Both noise and harmonic distortion factor are decreased. The power with which the signals are transmitted on the line can be reduced on the transmission side.

The composite loss distortion attenuation and basic attenuation are also reduced by the inventive overcurrent and overvoltage protective circuit, due to the fact that the power losses experienced in the LC-circuit on the primary side of the line transformer LT2 are reduced due to the absence in the inventive circuit of Ra and Rb of the known protective circuit shown in FIG. 1.

The inventive protective circuit will also reduce loop attenuation in comparison with the known protective circuit according to FIG. 1. This is because the balance network on the secondary side of the line transformer LT2 need not have correspondence to Ra and Rb. This results in an increase in so-called hybrid attenuation between transmitter and receiver.

It should be noted that the potential of the circuit board on which the inventive circuit is mounted does not change when an overvoltage pulse occurs. In the construction illustrated in FIG. 1, the overvoltage is conducted down onto the board through the zener diodes Z2 and Z4, causing the board potential to increase with subsequent risk of voltage flashover in the components.

The voltage source E in the circuit illustrated in FIG. 2 is excluded when the inventive overcurrent and overvoltage protective circuit is used in a terminal circuit or net terminal at the R-, S- or T-interface of an ISDN-network, or on the subscriber side of a conventional telephone network therewith obviating the need of the supply voltage source E.

It will be understood that the aforedescribed embodiment of the invention can be modified in many ways within the scope of the following claims.

I claim:

1. An overvoltage and overcurrent protective circuit for a terminal circuit or net terminal which has two input terminals (a, b) and a number of output terminals (T1-T4), wherein the input terminals are intended for connection to a two-wire line and the output terminals are intended for connection to equipment to be protected by the overvoltage and overcurrent protective circuit, said terminal circuit being intended for two-way transmission of digital and analogue signals over the line, comprising a line transformer (LT2) having a primary winding (L1, L2) a secondary winding (L3, L4) and a core, wherein the primary winding has two winding halves (L1, L2), a first earth-symmetrical protective circuit arranged on the primary side of the transformer and including a capacitor (C) and two current limiting resistors (Ra1, Ra2), wherein the capacitor is intended to be connected in series between the two winding halves such as to form a series combination which is connected across the input terminals (a, b), and a second earth-symmetrical protective circuit arranged at the secondary winding of the transformer and including zener diodes (Z5, Z8) for limiting the voltage across the output terminals, characterized in that the first protective circuit includes a varistor (V1) and two temperature-dependent semiconductor resistors (PTC1, PTC2), of which one resistor is connected in series between one end of the varistor and one coating of the capacitor, and the other resistor is connected in series between the other end of the varistor and the other coating of the capacitor; and in that the series combination is connected directly across the input terminals (a, b) in the absence of an intermediate series resistance.

2. A protector according to claim 1, characterized in that the second protective circuit includes a varistor (V2) which is connected in parallel across the terminal outputs of the secondary winding (L3, L4).

3. A protector according to claim 2, characterized in that the one current limiting resistor has a first end which is connected (Ra1) to earth, and a second end which is connected to said one end of the first varistor (V1); and in that the second current limiting resistor (Ra2) has a first end which is connected to earth and a second end which is connected to said second end of the varistor (V1).

4. A protector according to claim 3, characterized in that a voltage source (E) for supplying current to the line in a known manner is connected in series between the first ends of the current limiting resistors (Ra1, Ra2) and in that one pole of the voltage source is earthed.

* * * * *